(12) United States Patent
Arai et al.

(10) Patent No.: US 7,914,720 B2
(45) Date of Patent: Mar. 29, 2011

(54) ELECTROCONDUCTIVE STRUCTURE, MANUFACTURING METHOD THEREFOR, AND SEPARATOR FOR FUEL CELL

(75) Inventors: Toshihiro Arai, Kawasaki (JP); Hiroshi Sakamoto, Kawasaki (JP); Tomoaki Kobayashi, Kawasaki (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/777,124

(22) Filed: May 10, 2010

(65) Prior Publication Data

US 2010/0219551 A1    Sep. 2, 2010

Related U.S. Application Data

(62) Division of application No. 11/129,501, filed on May 16, 2005.

(60) Provisional application No. 60/573,348, filed on May 24, 2004.

(30) Foreign Application Priority Data

May 14, 2004   (JP) ................................. 2004-145235

(51) Int. Cl.
*B29C 70/00* (2006.01)
(52) U.S. Cl. ..... 264/105; 264/104; 264/478; 264/297.2; 264/319; 264/320; 264/325; 264/327; 264/328.1; 264/328.14; 264/328.16; 264/331.11; 264/331.13; 264/331.15
(58) Field of Classification Search .................. 264/104, 264/105, 297.2, 319, 320, 325, 327, 328.1, 264/328.14, 328.16, 331.11, 331.13, 331.15
See application file for complete search history.

(56) References Cited

U.S. PATENT DOCUMENTS

| | | | |
|---|---|---|---|
| 2,608,720 | A | 9/1952 | Meissner |
| 4,545,926 | A | 10/1985 | Fouts, Jr. et al. |
| 4,950,532 | A | 8/1990 | Das et al. |
| 6,846,436 | B1 | 1/2005 | Kitamura et al. |
| 7,329,698 | B2 | 2/2008 | Noguchi et al. |
| 2002/0051903 | A1 | 5/2002 | Masuko et al. |

(Continued)

FOREIGN PATENT DOCUMENTS

DE   41 06 658   9/1992

(Continued)

OTHER PUBLICATIONS

English Translation of JP2004/034611A to Washisaka.*

*Primary Examiner* — David Wu
*Assistant Examiner* — Vu A Nguyen
(74) *Attorney, Agent, or Firm* — Sughrue Mion, PLLC

(57) ABSTRACT

The present invention provides a method for manufacturing a conductive structure having high electrical conductivity, and a method for manufacturing a dimensionally accurate separator for a fuel cell having high electrical conductivity. In the present invention, the cavity surface temperature of a mold is kept equal to or higher than the crystal melting temperature ($T_m$) of composite material until the shaping of the composite material melted in the mold is completed, and after the completion of the shaping process, the cavity surface temperature of the mold is controlled to be equal to or higher than a temperature 20° C. lower than the crystallization temperature ($T_c$) of the composite material but equal to or lower than a temperature 20° C. higher than the crystallization temperature of the composite material to harden the composite material.

17 Claims, 1 Drawing Sheet

MEASUREMENT1 : R1=V1/A1

U.S. PATENT DOCUMENTS

| | | |
|---|---|---|
| 2003/0013798 A1 | 1/2003 | Iino et al. |
| 2003/0027030 A1 | 2/2003 | Kawashima et al. |
| 2003/0092818 A1 | 5/2003 | Matsuda et al. |
| 2003/0143452 A1 | 7/2003 | Ito et al. |
| 2003/0191228 A1 | 10/2003 | Noguchi et al. |

FOREIGN PATENT DOCUMENTS

| | | |
|---|---|---|
| JP | 8-222241 | 8/1996 |
| JP | 11-099546 | 4/1999 |
| JP | 2000-348739 | 12/2000 |
| JP | 2001-351643 A | 12/2001 |
| JP | 2002-060639 | 2/2002 |
| JP | 2002-097375 | 4/2002 |
| JP | 2003-109622 A | 4/2003 |
| JP | 2003-176327 | 6/2003 |
| JP | 2003-208905 A | 7/2003 |
| JP | 2003-257446 | 9/2003 |
| JP | 2003-288909 A | 10/2003 |
| JP | 2004-034611 | 2/2004 |
| JP | 2004-035826 | 2/2004 |
| JP | 2004-99675 A | 4/2004 |

* cited by examiner

MEASUREMENT1 : R1=V1/A1

MEASUREMENT2 : R2=V2/A2

ELECTROCONDUCTIVE STRUCTURE, MANUFACTURING METHOD THEREFOR, AND SEPARATOR FOR FUEL CELL

CROSS-REFERENCE TO RELATED APPLICATIONS

This application is a Rule 53(b) Divisional of U.S. application Ser. No. 11/129,501 filed May 16, 2005, which claims benefit of U.S. Provisional Application No. 60/573,348 filed May 24, 2004 and also claims foreign priority based on Japanese Patent Application No. 2004-145235 filed May 14, 2004. The above-noted applications are incorporated herein by reference in their entirety.

BACKGROUND OF THE INVENTION

1. Field of the Invention

The present invention relates to a method for manufacturing a conductive structure. In more detail, the present invention relates to a method for manufacturing a electroconductive structure made of crystalline thermoplastic resin composite material containing conductive filler material and having high electrical conductivity and heat resistance obtained by increasing the degree of crystallinity of the composite material, and to a method for manufacturing a separator for a fuel cell.

2. Description of Related Art

There have conventionally been used mainly metallic materials and/or carbon materials, etc., for applications that require high electrical conductivity. However, conductive resin compositions are likely to play a much larger role as one kind of conductive material due to the recent diversified applications of conductive materials in various fields such as electronics, electrochemistry, energy, and transport machinery. Accordingly, conductive resin compositions have achieved a remarkable breakthrough in terms of performance and functionality. As an important factor in this breakthrough a substantial improvement in molding processability due to composition of polymer materials can be mentioned.

It is important for conductive resin compositions to effectively develop electrical conductivity without practically losing mechanical characteristics and molding processability, etc. As applications that require electrical conductivity other than conventional ones are recently cited, for example, electronic materials such as circuit boards, resistors, laminates, and electrodes, heaters, pyrogen unit members, filter elements for dust collection, PTC elements, electronics parts, and semiconductor parts can be mentioned. In these applications, not only electrical conductivity but also high heat resistance is required.

Meanwhile, fuel cells have received widespread attention recently from the aspects of environmental issues and energy issues, etc. Fuel cells are clean generators that utilize hydrogen and oxygen to generate electricity through a reverse electrolytic process with no emissions other than water. Also in the field of fuel cells, conductive resin compositions can play an important role. Among several kinds of fuel cells according to type of electrolytes, proton-exchange membrane fuel cells are most promising for automotive and consumer use due to their low-temperature operability. Such fuel cells can achieve high-power generation by stacking unit cells composed of, for example, a polymer solid electrolyte, gas diffusion electrode, catalyst, and separator.

In a separator for separation within a single cell of thus arranged fuel cells is generally formed a flow path (groove) for supplying fuel gas (e.g. hydrogen) and oxidizing gas (e.g. oxygen) and for discharging generated moisture (water vapor) therethrough. Such a separator is therefore required to have high gas impermeability for complete separation of these gases and high electrical conductivity for reduced internal resistance. Such a separator is further required to have high heat conductivity, durability and strength.

In order to achieve the requirements above, there has conventionally been considered the possibility of using metallic materials or carbon materials for such a separator for a fuel cell. In respect to metallic materials of these materials, although it has been attempted to coat the surface thereof with precious metal or carbon in consideration of their poor corrosion resistances, there is a problem of insufficient durability and increased cost in coating.

Meanwhile, there have also been significant consideration given to carbon materials, and as a separator material for a fuel cell that can be mentioned, for example, a molded product obtained by press molding an exfoliated graphite sheet, a molded product hardened by impregnating a carbon sintered body with resin, and glassy carbon obtained by baking thermosetting resin, a molded product obtained by molding the mixture of carbon powder and resin can be mentioned.

For example, Patent Document 1 discloses a complex process comprising the steps of: adding bonding material to carbonaceous powder to perform heat mixing treatment and then CIP (Cold Isostatic Pressing) molding; baking and graphitizing the powder; impregnating and hardening the obtained isotropic graphite material with thermosetting resin; and cutting a gas flow groove by a cutting operation.

It has also been attempted to improve the performance of separators by changing the composition thereof. For example, Patent Document 2 discloses a separator having superior mechanical and electrical characteristics obtained by a composition of carbonaceous powder coated with resin and resin with higher heat resistance than that of the coating resin.

Patent Document 3 discloses a resin composition made of a mixture of low-melting metal, metal powder, thermoplastic resin, and thermoplastic elastomer.

Meanwhile, it has also been attempted to manufacture high-performance separators using a simple method by changing (arranging) the molding method thereof. For example, Patent Document 4 discloses a method for manufacturing a conductive molded product comprising the steps of: preliminarily heating a mold to the melting point of thermoplastic resin or higher; filling the mold cavity with a heated conductive composition; melting and shaping the composition in a compressive manner evenly at a predetermined pressure; and cooling the composition while applying pressure to the mold to below the thermal deformation temperature of the thermoplastic resin. Also Patent Documents 5 and 6 disclose methods of molding a highly conductive resin molded product characterized by setting the cavity surface temperature higher than a temperature that is 50° C. lower than the crystallization temperature of a thermoplastic resin composition and lower than the melting point of the composition to perform injection molding.

Patent Document 1: Japanese Unexamined Patent Application, First Publication No. Hei 8-222241

Patent Document 2: Japanese Unexamined Patent Application, First Publication No. 2003-257446

Patent Document 3: Japanese Unexamined Patent Application, First Publication No. 2000-348739

Patent Document 4: Japanese Unexamined Patent Application, First Publication No. 2003-109622

Patent Document 5: Japanese Unexamined Patent Application, First Publication No. 2004-35826

Patent Document 6: Japanese Unexamined Patent Application, First Publication No. 2004-34611

SUMMARY OF THE INVENTION

Although various conductive structures composed of the respective conventional conductive resin compositions disclosed in the foregoing Patent Documents are used to substantially increase loading of conductive filler material to develop high electrical conductivity, because there has been no way to increase the content of resin to keep molding processability, this has resulted in inability to obtain sufficiently high electrical conductivity. Further, the step of including baking structures at a high temperature of 1000 to 3000° C. for a long time to obtain high electrical conductivity suffers from a problem in that it takes a long time to manufacture and the manufacturing process becomes complicated, resulting in an increase in cost.

Although the molding method has also been arranged, the method for substantially changing the overall temperature of a mold as disclosed in Patent Document 4 requires too much time and energy to manufacture molded products at low cost. Further, reducing the temperature of the mold in an offhand manner cannot achieve electrical conductivity that is required for the structures. Although only the cavity surface temperature can efficiently be changed as disclosed in Patent Documents 5 and 6 to perform molding, when molding a high-speed-solidification highly conductive composition containing a great amount of conductive filler material and having a high heat conductivity, setting the surface temperature lower than the melting temperature of a thermoplastic resin composition allows the solidification of the resin to start before the completion of shaping, which often makes it difficult to obtain dimensionally accurate molded products.

It is accordingly an object of the present invention to provide a method for manufacturing a conductive structure capable of eliminating the above-mentioned defects of the prior art and having high electrical conductivity. It is another object of the present invention to provide a method for manufacturing a dimensionally accurate separator for a fuel cell having high electrical conductivity.

The present inventors have devoted themselves to their research in order to solve the above-mentioned problems, and found that increasing the degree of crystallinity of a conductive structure made of crystalline thermoplastic resin composition allows a high electrical conductivity to be developed by a simple low-cost method, leading to the completion of the present invention. The present invention is based on the foregoing findings and, in more detail, includes the following aspects [1] to [18] for example.

[1]

A method for manufacturing a conductive structure, wherein when molding a conductive structure made of crystalline thermoplastic resin composite material containing at least crystalline thermoplastic resin and conductive filler material, the cavity surface temperature of a mold is kept equal to or higher than the crystal melting temperature ($T_m$) of the composite material until the shaping of the composite material melted in the mold is completed, and after the completion of the shaping process, under the provision that the crystallization temperature of the composite material is represented by $T_c$, the cavity surface temperature of the mold is controlled to be $(T_c \pm 20)°$ C. to harden the composite material.

[2]

A method for manufacturing a conductive structure, wherein when molding a conductive structure made of crystalline thermoplastic resin composite material containing at least crystalline thermoplastic resin and conductive filler material, after the shaping of the composite material melted in a mold is completed, under the provision that the crystallization temperature of the composite material is represented by $T_c$, the composite material is cooled at a cooling rate of 30° C./min or less within a temperature range of $(T_c \pm 20)°$ C.

[3]

A method for manufacturing a conductive structure, wherein a molded conductive structure, which is made of crystalline thermoplastic resin composite material containing at least crystalline thermoplastic resin and conductive filler material, is heat-treated at a temperature equal to or lower than the crystal melting temperature ($T_m$) of the composite material but equal to or higher than $(T_m-20)°$ C.

[4]

The method for manufacturing a conductive structure according to any of aspects [1] to [3], wherein the conductive structure is hardened, cooled, and/or heat-treated while pressurized in the mold or while being pressurized in a sandwiched manner between corrective plates for preventing deformation of the conductive structure.

[5]

The method for manufacturing a conductive structure according to any of aspects [1] to [4], wherein the molding of the conductive structure contains one molding method selected among injection molding, injection-compression molding, compression molding, and stamping molding.

[6]

The method for manufacturing a conductive structure according to any of aspects [1] to [5], wherein the crystalline thermoplastic resin composite material further contains an elastomer.

[7]

The method for manufacturing a conductive structure according to any of aspects [1] to [6], wherein referring to the crystalline thermoplastic resin, the elastomer, and other high polymers collectively as a polymer component, the polymer component accounts for 2 to 40 mass %, while the conductive filler material accounts for 60 to 98 mass % of the total mass (100 mass %) of the polymer component and the conductive filler material.

[8]

The method for manufacturing a conductive structure according to any of aspects [1] to [7], wherein at least one component contained in the crystalline thermoplastic resin is polyolefin.

[9]

The method for manufacturing a conductive structure according to any of aspects [1] to [8], wherein the polymer component contains at least one of hydrogenated styrene-butadiene rubber, styrene-ethylene/butylene-styrene block copolymer, styrene-ethylene/propylene-styrene block copolymer, olefin crystal-ethylene/butylene-olefin crystal block copolymer, styrene-ethylene/butylene-olefin crystal block copolymer, styrene-isoprene-styrene block copolymer, and styrene-butadiene-styrene block copolymer and polyolefin.

[10]

The method for manufacturing a conductive structure according to any of aspects [1] to [9], wherein the polymer component contains at least polyvinylidene fluoride and soft acrylic resin.

[11]

The method for manufacturing a conductive structure according to any of aspects [1] to [10], wherein the conductive filler material contains at least one selected from the group of metallic material, carbonaceous material, conductive polymer, metal-coated filler, and metal oxide.

[12]

The method for manufacturing a conductive structure according to any of aspects [1] to [11], wherein the conductive filler material contains carbonaceous material containing 0.05 to 5 mass % of boron.

[13]

The method for manufacturing a conductive structure according to any of aspects [1] to [12], wherein the conductive filler material contains 0.1 to 50 mass % of vapor-grown carbon fiber and/or carbon nanotube (based on the total mass of the conductive filler material containing the same).

[14]

The method for manufacturing a conductive structure according to aspect [13], wherein the vapor-grown carbon fiber or the carbon nanotube contains 0.05 to 5 mass % of boron.

[15]

A conductive structure manufactured in accordance with the manufacturing method according to any of aspects [1] to [14].

[16]

A conductive structure made of crystalline thermoplastic resin composite material containing at least crystalline thermoplastic resin and conductive filler material, wherein the relationship expressed by the formula: $X \geq 0.8 \times Y$ (Formula 1) is satisfied. (In Formula 1, X represents a value obtained by dividing the crystal melting heat observed, using a differential scanning calorimeter, when heating a sample that is obtained from the conductive structure from 25° C. to a temperature 60° C. or more higher than the crystal melting temperature ($T_m$) of the thermoplastic resin composite material at a heating rate of 20° C./min by the mass of the sample, the unit of which is J/g. Also, Y represents a value obtained by dividing the crystal melting heat observed, using a differential scanning calorimeter, when keeping a sample that is obtained from the crystalline thermoplastic resin composite material at a temperature 60° C. or more higher than $T_m$ for 10 minutes, cooling the sample to 25° C. at a cooling rate of 5° C./min to be kept at 25° C. for 10 minutes, and then heating the sample to a temperature 60° C. or more higher than $T_m$ at a heating rate of 20° C./min by the mass of the sample, the unit of which is J/g.)

[17]

A conductive structure manufactured in accordance with the manufacturing method according to any of aspects [1] to [14] and satisfying Formula 1 described in aspect [16].

[18]

A separator for a fuel cell employing the conductive structure according to any of aspects [1] to [17].

The thus arranged conductive structure manufactured in accordance with the manufacturing method according to the present invention has superior conductive and heat radiation characteristics, and thereby is widely applicable to various applications and parts such as electronics, electrical appliances, machine parts, and automotive parts that have conventionally been difficult to realize, and in particular, is very useful as a separator for a fuel cell.

DETAILED DESCRIPTION OF THE INVENTION

Figure 1:
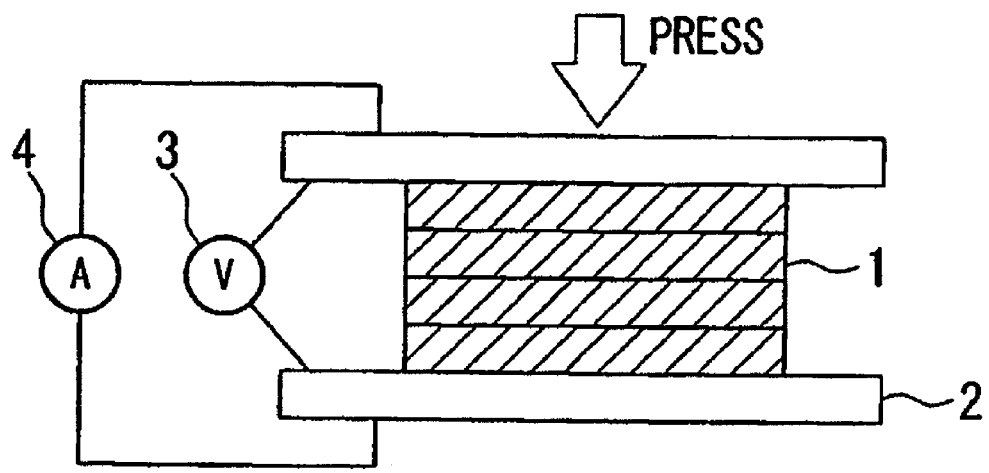
FIG. 1 is a schematic cross-sectional view illustrating a method for measuring the resistivity in a thickness direction, where the numerals 1, 2, 3 and 4 indicate, respectively, a test piece, gold-coated brass, a voltmeter, and a constant current generator.
Figure 1:
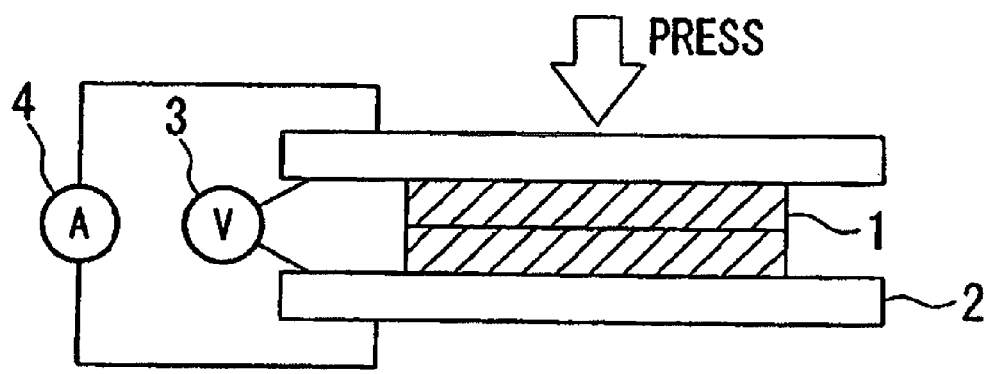

The present invention will hereinafter be described more specifically with reference to the accompanying drawings as appropriate. In the following descriptions, "parts" and "%" indicate ratios by mass unless otherwise stated.

(Crystalline Thermoplastic Resin Composite Material)

The crystalline thermoplastic resin composite material of the present invention is a composite material containing at least crystalline thermoplastic resin (component A) and conductive filler material (component B).

(Conductive Structure)

The conductive structure of the present invention is obtained by shaping such crystalline thermoplastic resin composite material into a predetermined shape by injection molding, etc. The structure has completely the same composition as that of the original crystalline thermoplastic resin composite material, but there is a difference, for example, in the degree of crystallinity due to heat history through the molding process.

(Polymer Component)

The crystalline thermoplastic resin composite material of the present invention may further contain an elastomer component (component C) and other high polymers such as amorphous thermoplastic resin and thermosetting resin in addition to the crystalline thermoplastic resin (component A). The components A and C and other high polymers are collectively referred to as a polymer component.

(Crystalline Thermoplastic Resin: Component A)

The crystalline thermoplastic resin of the present invention can contain any one or a combination of two or more selected, for example, from among polyvinyl chloride, polyimide, liquid crystal polymer, polyether ether ketone, fluorocarbon resin such as polyvinylidene fluoride and polytetrafluoroethylene, polyolefin such as polyethylene and polypropylene, polyacetal, polyamide, polyethylene terephthalate, polybutylene terephthalate, polyphenylene sulfide, polyphenylene oxide, and polyphenylene sulfone, but is not restricted thereto. Among these alternatives, polypropylene, polyvinylidene fluoride, polyphenylene sulfide, and liquid crystal polymer are preferable. Polypropylene is especially preferable due to the possibility of large flexural strain and high resistance to hydrolysis.

(Elastomer: Component C)

The crystalline thermoplastic resin composite material of the present invention may also contain an elastomer component. Elastomer is a polymer that has rubber-like elasticity at around ambient temperature. The elastomer component can contain any one or a combination of two or more selected, for example, from among acrylonitrilebutadiene rubber, hydrogenated nitrile rubber, styrene-butadiene rubber, ethylene-propylene rubber, ethylene-propylene-diene ternary copolymer rubber, ethylene-butadiene rubber, fluorocarbon rubber, isoprene rubber, silicon rubber, acrylic rubber, butadiene rubber, high-styrene rubber, chloroprene rubber, urethane rubber, polyether-based special rubber, tetrafluoroethylene-propylene rubber, epichlorohydrin rubber, norbornene rubber, butyl rubber, styrene-based thermoplastic elastomer, olefin-based thermoplastic elastomer, urethane-based thermoplastic elastomer, polyester-based thermoplastic elastomer, polyamide-based thermoplastic elastomer, 1,2-polybutadien-based thermoplastic elastomer, fluorinated thermoplastic elastomer, and soft acrylic resin, but is not restricted thereto.

The elastomer component contained in the crystalline thermoplastic resin composite material of the present invention preferably accounts for 0.01 to 50 mass % of the polymer component (100 mass %), but is not restricted thereto. If the elastomer component accounts for 50 mass % or more, the effect of the present invention is reduced. Further, a content of 0.01 to 30 mass % is especially preferable due to the possibility of prominently exhibiting the effect of the present invention and of obtaining large flexural strain and high flexural strength simultaneously.

Among the alternatives for a polymer component containing an elastomer, a polypropylene/styrene-based thermoplastic elastomer blend, a polyvinylidene fluoride/fluorinated thermoplastic elastomer blend, a polyvinylidene fluoride/soft acrylic resin blend, and a polyphenylene sulfide/styrene-based thermoplastic elastomer blend, etc., are preferable. Among these alternatives, a polypropylene/styrene-based thermoplastic elastomer blend and a polyphenylene sulfide/styrene-based thermoplastic elastomer blend are especially preferable due to the possibility of large flexural strain and high resistance to hydrolysis.

As a styrene-based thermoplastic elastomer to be used in the crystalline thermoplastic resin composite material of the present invention, there can be cited, for example, hydrogenated styrene-butadiene rubber, styrene-ethylene/butylene-styrene block copolymer, styrene-ethylene/propylene-styrene block copolymer, olefin crystal-ethylene/butylene-olefin crystal block copolymer, styrene-ethylene/butylene-olefin crystal block copolymer, styrene-isoprene-styrene block copolymer, and styrene-butadiene-styrene block copolymer. Among these alternatives, hydrogenated styrene-butadiene rubber, styrene-ethylene/butylene-styrene block copolymer, and styrene-ethylene/propylene-styrene block copolymer are preferable due to the possibility of high dispersibility in the crystalline thermoplastic resin.

(Amorphous Thermoplastic Resin)

The crystalline thermoplastic resin composite material of the present invention may contain amorphous thermoplastic resin within the scope of not taking away from the effects of the present invention. The amorphous thermoplastic resin can contain any one or a combination of two or more selected, for example, among polystyrene, acrylic resin, polycarbonate, and polycycloolefin, but is not restricted thereto.

Further, the thermoplastic resin to be used in the crystalline thermoplastic resin composite material of the present invention preferably has as high a molecular weight as possible due to the possibility of superior bending characteristics. For example, when employing polypropylene as the crystalline thermoplastic resin, the melt flow rate (MFR) thereof is preferably 10 or less. Polypropylene resin with a MFR of 2 or less is especially preferable due to the possibility of obtaining large flexural strain and high flexural strength simultaneously. MFR here is measured at a temperature of 230° C. under a load of 2.16 kg in conformity with JIS K 6921-2.

(Other Components)

In addition to the foregoing components, any component selected among various additives such as thermosetting resin, monomer, plasticizing agent, curing agent, curing initiator, curing aid, solvent, ultraviolet stabilizer, antioxidant, thermal stabilizer, antifoaming agent, leveling agent, mold-releasing agent, lubricant, water repellent agent, thickener, low shrinkage agent, flame retardant, and hydrophilicizing agent may be added to the polymer component as appropriate.

(Method for Manufacturing Polymer Component)

As a method for manufacturing the component A of the present invention physical methods such as a solution method, emulsion method, and melting method and chemical methods such as graft polymerization method, block polymerization method, and IPN (Interpenetrating Polymer Networks) method can be cited, but it is not restricted thereto.

When manufacturing a polymer component by blending different kinds of polymers, a melting method is preferable in terms of diversity. As a specific procedure for a melting method, for example, a blending procedure utilizing a kneading machine such as a roller, kneader, Banbury mixer, or extruding machine can be cited, but it is not restricted thereto.

(Conductive Filler Material: Component B)

In the present invention, the component B that constitutes the crystalline thermoplastic resin composite material together with the component A is not subject to any specific restrictions as long as it is a conductive filler material. The component B preferably employs any one or a combination of two or more selected from among metallic material, carbonaceous material, conductive polymer, metal-coated filler, and metal oxide in terms of electrical conductivity. Carbonaceous material and/or metallic material are more preferable.

(Metallic Material)

The metallic material preferably contains any one or a composite material of two or more selected among Ni, Fe, Co, B, Pb, Cr, Cu, Al, Ti, Bi, Sn, W, P, Mo, Ag, Pt, Au, TiC, NbC, TiCN, TiN, CrN, $TiB_2$, $ZrB_2$, $Fe_2B$ in terms of electrical conductivity. These metallic materials can further be used as a powder or a fiber.

(Carbonaceous Material)

The carbonaceous material can contain any one or a combination of two or more selected among carbon black, carbon fiber, amorphous carbon, exfoliated graphite, artificial graphite, natural graphite, vapor-grown carbon fiber, carbon nanotube, and fullerene in terms of electrical conductivity.

It is further preferable that the carbonaceous material contain 0.05 to 5 mass % of boron to increase the electrical conductivity thereof. If the content of boron is less than 0.05 mass %, it is very likely that no intended highly conductive graphite powder can be obtained. On the contrary, if the content of boron is more than 5 mass %, it is likely that the degree of contribution of the carbon material to the increase in electrical conductivity is reduced. The content of boron in the carbonaceous material can be measured by any measuring method without being subject to any specific restrictions. In the present invention, a valve is used which is measured by the Inductively Coupled Plasma-emission spectroscopy method (hereinafter abbreviated as "ICP") or Inductively Coupled Plasma-emission Mass Spectroscopy method (hereinafter abbreviated as "ICP-MS"). More specifically, in order to measure the content of boron, sulfuric acid and nitric acid are added to a sample to be resolved through microwave heating (at 230° C.) (digester method), and perchloric acid ($HClO_4$) is further added thereto, and then the resolved sample is diluted by adding water to be put on an ICP spectrometer.

(Method for Adding Boron)

It is possible to add boron to the carbonaceous material using a method in which a boron source such as a B unit, $B_4C$, BN, $B_2O_3$, or $H_3BO_3$ is added to any one or a mixture of two or more of natural graphite, artificial graphite, exfoliated graphite, carbon black, carbon fiber, vapor-grown carbon fiber, and carbon nanotube, etc., and then mixed sufficiently to be graphitized at about 2300 to 3200° C. If the boron compound has not been mixed homogeneously, not only does the graphite powder becomes heterogeneous, but also it is likely that the powder may be sintered in the graphitization process. In order to mix the boron compound homogeneously, the foregoing boron sources preferably have a grain diameter of about 50 μm or less, and more preferably about 20 μm or less, and are mixed together with powder such as coke.

If no boron is added, it is likely that the degree of graphitization (degree of crystallinity) is reduced, the grid interval increased, and it will become more difficult to obtain highly conductive graphite powder. Also, as a more preferable mode of boron incorporation a mode where boron exists between layers of the graphite crystal and a mode where some carbon atoms that partially form the graphite crystal are replaced with boron atoms can be cited, but there is no restriction thereto as long as boron and/or a boron compound are mixed in the graphite. The bonding between boron atoms and carbon atoms when some carbon atoms are replaced with boron atoms can employ any bonding manner such as covalent bonding or ion bonding.

(Carbon Black)

As carbon black as an example of the above-mentioned carbonaceous material, for example, Ketjen black generated by imperfect combustion of natural gas, etc., or thermal decomposition of acetylene, acetylene black, furnace carbon generated by imperfect combustion of hydrocarbon oil or natural gas, and thermal carbon generated by thermal decomposition of natural gas can be cited.

(Carbon Fiber)

There are pitch-based carbon fibers made of heavy oil, by-product oil, and/or coal tar, etc., and PAN-based carbon fibers made of polyacrylonitrile.

(Amorphous Carbon)

In order to obtain amorphous carbon, there can be cited, for example, a method in which phenol resin is hardened, baked, and crushed into powder and a method in which phenol resin is hardened while in a spherically irregular powder state and baked. It is preferable to perform heat treatment at 2000° C. or more to obtain highly conductive amorphous carbon.

(Exfoliated Graphite Electrode)

The above-mentioned exfoliated graphite powder can employ, for example, powder obtained by immersing highly crystallized graphite such as natural graphite or thermally decomposed graphite into a strongly acidic solution such as a mixture of concentrated sulfuric acid and nitric acid or a mixture of concentrated sulfuric acid and hydrogen peroxide solution to generate a graphite intercalation compound, and then washing and heating the compound rapidly to expand the graphite crystal in the C-axis direction, or powder obtained by rolling thus obtained powder into a sheet-like structure to be crushed again.

(Artificial Graphite)

In order to obtain artificial graphite, coke is first manufactured in general. Coke is obtained by carbonizing petroleum pitch or coal pitch, etc. In order to obtain graphite powder from coke, there can generally be cited, for example, a method in which crushed coke is graphitized, a method in which graphitized coke is crushed, and a method in which coke with a binder added thereto is molded and baked, and the baked products (coke and baked products are collectively referred to as cokes) are graphitized and then crushed into powder. Since it is advantageous for the coke to be as little crystallized as possible, it is preferable to perform heat treatment at 2000° C. or less, and more preferably 1200° C. or less.

The graphitization method can employ a method that utilizes an Acheson furnace in which powder is set in a graphite crucible to be energized directly or a method in which powder is heated by means of a graphite exothermic body.

In order to crush coke, artificial graphite, and natural graphite, etc., it is possible to use any of the various high-speed rotary pulverizers (hammer mill, pin mill, cage mill), various ball mills (tumbling mill, vibrating mill, epicyclic mill), and various stirring mills (beads mill, attritor, flow tube type mill, annular mill). It is also possible to use a fine pulverizer such as a screen mill, turbo mill, super-micron mill, or jet mill by selecting a condition. Coke and natural graphite, etc., are crushed using any of these pulverizers, while selecting a crushing condition, classifying powder as appropriate, and controlling the average grain diameter and grain size distribution.

Any method can be used to classify coke powder, artificial graphite powder, and natural graphite powder, etc., as long as the method can make a classification. It is possible to use, for example, a screening method or a method that utilizes an airflow classifier such as a forced vortex type centrifugal classifier (Micron separator, Turboplex classifier, Turbo classifier, Super separator) or an inertial classifier (Improved Virtual Impactor, Elbow-Jet classifier). It is also possible to use a wet sedimentation separation method or a centrifugal classification method.

(Vapor-Grown Carbon Fiber/Carbon Nanotube)

The component B of the present invention preferably contains 0.1 to 50 mass % of vapor-grown carbon fiber and/or carbon nanotube, more preferably 0.1 to 45 mass %, and further preferably 0.2 to 40 mass %. If the content is less than 0.1 mass %, there is no contribution to the increase in electrical conductivity, while if the content is more than 50 mass %, it is likely that moldability is reduced.

In addition, the vapor-grown carbon fiber or carbon nanotube preferably contains 0.05 to 5 mass % of boron, more preferably 0.06 to 4 mass %, and further preferably 0.06 to 3 mass %. If the content is less than 0.05 mass %, there is little contribution in adding boron to the increase in electrical conductivity, while if the content is more than 5 mass %, it is likely that other physical properties are reduced due to the increase in the amount of impurities.

Vapor-grown carbon fibers can be obtained by thermally decomposing an organic compound material such as benzene, toluene, or natural gas together with hydrogen gas at 800 to 1300° C. under the existence of a transition metal catalyst such as ferrocene, the fiber diameter of which is about 0.5 to 10 μm. Further, it is preferable to subsequently perform graphitization treatment at about 2300 to 3200° C., and more preferably with a graphitization catalyst such as boron, boron carbide, beryllium, aluminum, or silicon.

Carbon nanotubes have received industrial attention recently due to not only their mechanical strength but also field emission features and hydrogen absorption features, and further increasingly their magnetic features. This kind of carbon nanotube is also referred to as graphite whisker, filamentous carbon, graphite fiber, superfine carbon tube, carbon tube, carbon fibril, carbon microtube, or carbon nanofiber, the fiber diameter of which is about 0.5 to 100 nm. Carbon nanotubes can be classified into two categories: single-walled carbon nanotubes composed of a single layer of graphite film and multi-walled carbon nanotubes composed of multiple layers of graphite films. Although the present invention can employ either of a single-walled or a multi-walled carbon nanotube, it is preferable to employ a single-walled carbon nanotube whereby it is likely that a composition having a higher electrical conductivity and mechanical strength is obtained.

Carbon nanotubes can be produced by, for example, an arc discharge method, laser evaporation method, or thermal decomposition method described in Saito and Bando, "Fundamentals of Carbon Nanotubes" (pp. 23-57, published by Corona Publishing Co., Ltd. in 1998), and then further purified by, for example, a hydrothermal method, centrifugal separation method, ultrafiltration method, or oxidation method. It is more preferable to perform heat treatment in an inert gas atmosphere of about 2300 to 3200° C. to eliminate impurities, and further preferably with a graphitization catalyst such as boron, boron carbide, beryllium, aluminum, or silicon.

(Composition)

In the present invention, it is preferable that the polymer component accounts for 2 to 40 mass %, while the component B accounts for 60 to 98 mass % of the total mass (100 mass %) of the polymer component and the component B. More preferably, the polymer component accounts for 5 to 30 mass %, while the component B accounts for 70 to 95 mass %, and further preferably the polymer component accounts for 5 to 25 mass %, while the component B accounts for 75 to 95 mass %. If the polymer component accounts for less than 2 mass %, it is likely that moldability is reduced. On the contrary, if the polymer component accounts for more than 40 mass %, it is more likely that the volume resistivity results in 1 Ωcm or more.

(Additives)

In order to improve the hardness, strength, electrical conductivity, moldability, durability, weather resistance, and water resistance of the crystalline thermoplastic resin composite material of the present invention, it is further possible, as appropriate, to add additives such as glass fiber, whisker, metal oxide, organic fiber, ultraviolet stabilizer, antioxidant, mold-releasing agent, lubricant, water repellent agent, thickener, low shrinkage agent, and hydrophilicizing agent.

(Manufacturing Method)

Although the method for manufacturing a crystalline thermoplastic resin composite material according to the present invention is not subject to any specific restrictions, it is preferable to mix the foregoing components as uniformly as possible using a mixing machine or a kneading machine that is generally used in resin applications, such as a roll, extruding machine, kneader, Banbury mixer, Henschel mixer (trademark), or planetary mixer.

There can also be cited, for example, a method in which a preliminarily manufactured polymer component is mixed with component B and a method in which each polymer component is kneaded under the existence of component B, but there is no restriction thereto.

In order to facilitate material supply to a molding machine and a mold, the crystalline thermoplastic resin composite material of the present invention may be crushed or granulated as appropriate after the kneading or mixing process. For the crushing operation, it is possible to use a homogenizer, Wiley mill, or high-speed rotary pulverizer (hammer mill, pin mill, cage mill, blender), etc., and it is preferable to cool the material during the crushing operation to prevent mutual coagulation of materials. For the granulation operation, it is possible to use an extruding machine, extruder, or co-kneader, etc., for pelletization or to use a rotary pan type granulator, etc.

(Method for Manufacturing a Conductive Structure)

Methods of manufacturing a conductive structure according to the present invention will hereinafter be described in detail.

(First Manufacturing Method)

When molding a conductive structure made of such crystalline thermoplastic resin composite material as above, the cavity surface temperature of a mold is kept equal to or higher than $T_m$ until the shaping of the composite material melted in the mold is completed, and after the completion of the shaping process, the cavity surface temperature of the mold is controlled to be $(T_c-20)°$ C. or more but $(T_c+20)°$ C. or less to harden the composite material, and then the conductive structure is taken out of the mold. It is noted that $T_m$ indicates a crystal melting temperature, and Tc a crystallization temperature, and a method for measuring the temperatures will hereinafter be described. Here, molding is a general term for methods of manufacturing molded products using a mold or a metal frame, and there can be cited, for example, injection molding, injection-compression molding, compression molding, and stamping molding. Among these methods, compression molding and stamping molding are preferably used for the reason that dimensionally accurate conductive structures can be obtained. Also, injection molding and injection-compression molding are preferably used for the reason that molding cycle time can be reduced. Further, injection-compression molding is particularly preferably used for the reason that there occurs no reduction in electrical conductivity due to a skin layer formed on the surface of molded products, which cannot be avoided using an injection molding method. It is possible to vacuum the inside of or the entire mold to eliminate voids in the structure during the molding process.

Here, shaping means applying pressure to a melted composite material to transfer the cavity shape of a mold to the composite material, and more specifically the operations before the compression of the mold is completed for the case of compression molding, stamping molding, or injection-compression molding, while the operations before the injection is completed for the case of injection molding. Also, hardening means hardening the composite material to the degree of not being damaged or deformed when taking the structure out of the mold. The structure may be deformed after being taken out of the mold due to post-crystallization of the composite material, where it is necessary to correct the structure not to be deformed.

Molding conditions of special importance in the first manufacturing method that should be controlled precisely are the mold temperature and the cavity surface temperature. It is necessary to control the mold temperature and the cavity surface temperature, as mentioned above, in such a manner that the surface temperature is kept equal to or higher than $T_m$ until the shaping of the composite material in the mold is completed, and after the completion of the shaping process, the surface temperature is controlled to be $(T_c-20)°$ C. or more but $(T_c+20)°$ C. or less to cool and harden the composite material. The cavity surface temperature is more preferably kept equal to or higher than $(T_m+5)°$ C. during the shaping process for the reason that more dimensionally accurate structures can be molded. However, completing the shaping process with an extremely high surface temperature requires a lot of time to cool the structure, resulting in an increase in molding cycle time, which may obstruct the efficient manufacturing of conductive structures. It is therefore preferable that the cavity surface temperature when completing the shaping process is $(T_m+10)°$ C. or less.

In addition, it is necessary, after the shaping process, to keep the mold temperature and the cavity surface temperature equal to or higher than $(T_c-20)°$ C. but equal to or lower than $(T_c+20)°$ C. when cooling and hardening the composite material, and preferably equal to or higher than $(T_c-10)°$ C. but equal to or lower than $(T_c+15)°$ C. Cooling the composite material form melted state at a mold temperature and a cavity surface temperature in this range allows the crystallization of the composite material to be promoted significantly, resulting in a substantial reduction in the volume resistivity and the resistivity in a thickness direction of the conductive structure. It is further preferable that the mold temperature and the cavity surface temperature when cooling and hardening the composite material is kept equal to or higher than $T_c$ but equal to or lower than $(T_c+15)°$ C. due to the possibility of increasing the effect of the present invention. Also, for the case of injection molding or injection-compression molding, dwelling may be applied inside the cavity of the mold after the completion of the shaping of the composite material to prevent warpage or sink of the conductive structure.

As a method for thus controlling the mold temperature and the cavity surface temperature, there can be cited a method in which water or oil is circulated within the mold and a method that utilizes a temperature profiling mold capable of controlling the mold temperature and the cavity surface temperature using a mold heater. There can also be cited a method in which the mold temperature is set to a temperature when cooling the composite material, and the cavity surface temperature and the temperature of the composite material are temporarily increased immediately before the molding process by inductive heating, infrared radiation, ultrasonic waves, an electric field, or a magnetic field. It is also possible to use an adiabatic mold with an adiabatic layer provided on the cavity surface. In addition, a mold having a plurality of cavities may be used to manufacture a plurality of conductive structures at a time to carry out a reduction in cost.

In order to measure the mold temperature and the cavity surface temperature, it is possible to use a commercial mold thermometer, or to provide a temperature sensor in the mold, on the cavity surface, and/or in the vicinity of the cavity surface to perform measuring.

The crystal melting temperature $T_m$ of the crystalline thermoplastic resin composite material is measured using a differential scanning calorimeter (hereinafter abbreviated as DSC) as follows. An aluminum pan, in which part (10 mg) of the crystalline thermoplastic resin composite material is precisely weighed as a sample, is set in the DSC together with an empty aluminum pan carrying no sample. Both aluminum pans are held at a temperature at which the sample can completely be melted (since an accurate melting temperature is not known at this point, a temperature 60° C. or more higher than the crystal melting temperature of the crystalline thermoplastic resin contained in the sample is used as a measure) for 10 minutes, and then cooled to 25° C. at a cooling rate of 20° C./min. Subsequently, after the sample is kept at 25° C. for 10 minutes, the sample is reheated at a heating rate of 20° C./min to the temperature at which the sample can completely be melted. The top temperature of the endothermic peak due to crystal melting in this process is represented by $T_m$. If there is a plurality of endothermic peaks, the top temperature of the endothermic peak that indicates the highest temperature is represented by $T_m$.

Also, the crystallization temperature $T_c$ of the crystalline thermoplastic resin composite material is measured using a DSC as follows. An aluminum pan, in which part (10 mg) of the crystalline thermoplastic resin composite material is precisely weighed as a sample, is set in the DSC together with an empty aluminum pan carrying no sample. Both aluminum pans are held at a temperature 60° C. or more higher than $T_m$ for 10 minutes, and then cooled to 25° C. at a cooling rate of 20° C./min. The top temperature of the exothermic peak due to crystallization in this process is represented by $T_c$. If there is a plurality of exothermic peaks, the exothermic peak of a crystalline thermoplastic resin that has the largest volume fraction among components that constitute the composite material is represented by $T_c$.

(Second Manufacturing Method)

When molding a conductive structure made of such crystalline thermoplastic resin composite material as above, after the shaping of the composite material melted in a mold is completed, the composite material is cooled and hardened at a cooling rate of 30° C./min or less within a temperature range between $(T_c+20)$ and $(T_c-20)°$ C., and then the conductive structure is taken out of the mold. The conditions under which the composite material is shaped in the mold are the same as those in the first manufacturing method. After the molding process, the composite material is cooled at a cooling rate of 30° C./min or less, and preferably 20° C./min within the temperature range. This allows the crystallization of the composite material to be promoted significantly, resulting in a substantial reduction in the volume resistivity and resistivity in a thickness direction of the conductive structure. It is further preferable that the composite material be cooled at a cooling rate of 10° C./min within the temperature range due to the possibility of increasing the effects of the present invention.

(Third Manufacturing Method)

When manufacturing a conductive structure made of such a crystalline thermoplastic resin composite material as above, a molded conductive structure is taken out of the mold and heat-treated (annealed) at a temperature equal to or lower than $T_m$ but equal to or higher than $(T_m-30)°$ C. to have high electrical conductivity. In the present third manufacturing method, the molding of the conductive structure is not subject to any specific restrictions as long as the structure is heat-treated after the molding process. However, if crystallization has been promoted significantly during the molding process, the crystallization promoting effect due to heat treatment after the molding process cannot be exhibited prominently. Therefore, in order to increase the heat treatment effect after the molding process, it is preferable that no crystallization be promoted during the molding process. The temperature for heat treatment is $T_m$ or lower but $(T_m-30)°$ C. or higher, and preferably $T_m$ or lower but $(T_m-20)°$ C. or higher. This allows the crystallization of the composite material to be promoted significantly, resulting in a substantial reduction in volume resistivity and resistivity in a thickness direction of the conductive structure. It is further preferable that the composite material be heat-treated at a temperature equal to or lower than $T_m$ but equal to or higher than $(T_m-20)°$ C. due to the possibility of increasing the effect of the present invention.

(Preventing Deformation of Conductive Structure)

In order to prevent deformation when hardening and cooling the composite material in the first and second manufacturing methods, and/or when heat-treating the conductive structure in the third manufacturing method, it is preferable that the conductive structure be pressurized in the mold or pressurized in a sandwiched manner between corrective plates for preventing deformation of the conductive structure. This is for the reason that since the crystallization of the composite material is promoted significantly through the cooling and heat treatment, it is more likely that the conductive structure may be deformed.

Specific examples of the above-mentioned manufacturing methods will hereinafter be outlined. However, the present invention is not restricted to any of the following examples.

(Method for Compression Molding)

An example of a method for compression molding a conductive structure according to the present invention will hereinafter be described. On a mold for compression molding is mounted a temperature profiling device capable of unrestrainedly changing the cavity surface temperature of the mold precisely. It is particularly preferable that the mold temperature (molding temperature) be $(T_m+50)°$ C. or more, but it is not restricted thereto as long as the crystalline thermoplastic resin composite material of the present invention can be melted but cannot be thermally decomposed at the temperature. After setting the temperature, composite material powder or grain is arranged on the cavity of the mold. In this case, in order to obtain conductive structures with thickness accuracy, preliminary molded bodies molded preliminarily using an extruding machine, roller, or calendar, etc., to have a predetermined thickness and size may be arranged on the cavity of the mold. In order to mold conductive structures with higher thickness accuracy, it is preferable that preliminary molded bodies are molded using an extruding machine, and then rolled through a roller or calendar. In order to eliminate void and air from preliminary molded bodies, it is preferable that the extrusion molding be performed in a vacuum. Then, the mold is closed to preheat the composite material for enough time to allow the material to be melted, and then the material is pressurized and molded in a compressive manner. In this case, a plurality of conductive structures may be molded at a time using a mold having a plurality of cavities or a multistage compression molding machine with a plurality of dies. In order to obtain nondefective products having no substantive defects, it is preferable to vacuum the inside of the cavity. After the melting and molding processes, the cavity surface is cooled from the molding temperature to $(T_c-20)°$ C. at a cooling rate of 10° C./min, and then the conductive structure is taken out of the mold, whereby it is possible to obtain a conductive structure according to the present invention.

(Method for Injection-Compression Molding)

An example of a method for injection-compression molding a conductive structure according to the present invention will hereinafter be described. It is preferable that the temperature of a plasticizing cylinder be set to about 30 to 60° C. higher than $T_m$, but it is not restricted thereto as long as the crystalline thermoplastic resin composite material of the present invention can be melted but cannot be thermally decomposed at the temperature. On a mold is mounted a temperature profiling device capable of unrestrainedly changing the cavity surface temperature of the mold precisely, whereby the cavity temperature and the mold surface temperature are set to $(T_m+5)°$ C. After it is confirmed that the temperatures of the cylinder and the mold are constant, a pellet made of the crystalline thermoplastic resin composite material of the present invention is set into the hopper of an injection-compression molding machine. Injection-compression molding conditions such as material accounting, injection rate, injection pressure, secondary pressure, mold clamping force, and cooling time are not subject to any specific restrictions but to be set in such a manner as to be able to obtain conductive structures preferably. Melted composite material is injected to fill the cavity of the mold, and then compressed. Subsequently, the cavity surface temperature of the mold is cooled to $(T_c+10)°$ C. at a cooling rate of 20° C./min to harden the composite material, and then the conductive structure is taken out of the mold. In order to further cool the conductive structure after it is taken out of the mold, the structure may be pressurized in a sandwiched manner between corrective plates for preventing deformation of the conductive structure.

Also, when injection molding or injection-compression molding a conductive structure according to the present invention, an adiabatic mold with an adiabatic layer provided on the wall surface of the cavity may be used instead of a mold on which a temperature profiling device capable of unrestrainedly changing the mold temperature precisely is mounted. Also, the cavity surface of the mold may be heated immediately before the molding process by inductive heating, infrared radiation, or ultrasonic wave, etc. There is a further effective molding method in which after the cavity of the mold is filled with the composite material, an electric field or magnetic field is applied to the cavity to control the hardening of the composite material. In addition, carbon dioxide may be supplied through the intermediate part of the cylinder of the molding machine to be dissolved into the material, so that the material is molded in a supercritical state.

(Conductive Structure)

In the present invention, the conductive structure made of crystalline thermoplastic resin composite material preferably satisfies the relationship expressed by the formula: $X \geq 0.8 \times Y$ (Formula 1).

In Formula 1, X represents a value obtained by dividing the crystal melting heat observed, using a differential scanning calorimeter, when heating a sample of about 10 mg that is obtained from the conductive structure from 25° C. to a temperature 60° C. or more higher than $T_m$ at a heating rate of 20° C./min by the mass of the sample, the unit of which is J/g. Also, Y represents a value obtained by dividing the crystal melting heat observed, using a differential scanning calorimeter, when keeping a sample of about 10 mg that is obtained from the crystalline thermoplastic resin composite material at a temperature 60° C. or more higher than $T_m$ for 10 minutes, cooling the sample to 25° C. at a cooling rate of 5° C./min to be kept at 25° C. for 10 minutes, and then heating the sample to a temperature 60° C. or more higher than $T_m$ at a heating rate of 20° C./min by the mass of the sample, the unit of which is J/g. It is noted that the value of $T_m$ should be obtained in advance by measuring the properties of the crystalline thermoplastic resin composite material using a DSC.

In Formula 1, Y is a value representing the melting heat when the degree of crystallinity of the crystalline thermoplastic resin composite material reaches almost the limit (it will be appreciated that although the degree of crystallinity may be slightly increased and the melting heat may also be increased higher than the measured value under the foregoing conditions if the material is annealed at around the crystallization temperature for a long time (several hours), the measurement takes too much time). Therefore, Formula 1 indicates that the degree of crystallinity of the conductive structure according to the present invention is 80% or more of the crystallization limit of the composite material. Conductive structures that satisfy Formula 1 have a high electrical conductivity, flexural strength, and flexural modulus.

(Separator)

The method for manufacturing a separator for a fuel cell using the crystalline thermoplastic resin composite material of the present invention is not subject to any specific restrictions. As a specific example of the manufacturing method a compression molding method, transfer molding method, injection molding method, or cast molding method can be cited, along with an injection-compression molding method, but it is not restricted thereto. It is more preferable to vacuum the inside of or the entire mold in the molding process.

In order to increase the molding cycle rate in a compression molding process, it is preferable to use a multi-cavity mold. It is further preferable to use a multistage press (stacking press) method whereby many products can be molded with a small output in order to improve the profile accuracy of a planar product, and it is preferable to compression mold a sheet once molded.

In order to further improve the moldability in an injection molding process, carbon dioxide may be supplied through the intermediate part of the cylinder of the molding machine to be dissolved into the material, so that the material is molded in a supercritical state. In order to improve the profile accuracy of products, it is preferable to use an injection-compression molding method. As an injection-compression molding method, for example, a method in which the material is injected with the mold opened, a method in which the material is injected while closing the mold, and a method in which the mold clamping force against the closed mold is once released, and then applied again after the material is injected can be cited.
(Mold)

The mold to be used in the molding process of the present invention is not subject to any specific restrictions as long as the temperature thereof can be controlled as mentioned above. For example, in the case of a material having a high hardening rate and low liquidity, it is preferable to use an adiabatic mold with an adiabatic layer provided in the cavity. A mold introducing a temperature profiling system capable of increasing and decreasing the mold temperature during a molding process is further preferable. As a temperature profiling system, there can be cited, for example, a system in which inductive heating and a cooling medium (e.g. air, water, or oil) are switched and a system in which a heating medium (e.g. hot water or heating oil) and a cooling medium are switched, but it is not restricted thereto.

It is important to select and search for the optimum mold temperature in accordance with the type of the crystalline thermoplastic resin composite material, $T_m$, and $T_c$. For example, the optimum value can be decided within a temperature range between 90 and 200° C. and a time range between 10 and 1200 seconds. The method for necessarily cooling a molded product that is taken out at a high temperature is not subject to any specific restrictions. For example, in order to prevent warpage, there can be cited, for example, a method in which the molded product is cooled in a sandwiched manner between cooling plates and a method in which the molded product is cooled together with the mold.

It is possible to obtain a separator for a fuel cell according to the present invention, on both sides or one side of which is formed a gas flow path, by molding the conductive resin composition of the present invention in accordance with the foregoing molding method. The gas flow path (e.g. groove) may be formed by machining the molded body of the conductive resin composition. The gas flow path may also be formed by compression molding or stamping molding, etc., using a mold having the inverted shape of the gas flow path.

The cross-sectional shape and the shape of the flow path in the separator of the present invention are not subject to any specific restrictions. For example, the cross-section of the flow path may have a rectangular, trapezoidal, triangular, or semicircular shape. The flow path may have, for example, a straight or meandering shape. The width of the flow path is preferably 0.1 to 2 mm, and the depth 0.1 to 1.5 mm.

The thickness of the thinnest part in the separator of the present invention is preferably 1 mm or less, and more preferably 0.8 mm. If the thickness is more than 1 mm, the thickness of the separator is increased, resulting in an undesired increase in voltage drop in the separator due to the resistance thereof.

The separator for a fuel cell of the present invention is preferably formed with a through hole that serves as a manifold through which gas and water flow. As a method for forming a through hole, for example, a method in which a through hole is formed during the molding process and a method in which a through hole is formed by a cutting operation after the molding process can be cited, but it is not restricted thereto.

(Applications of Conductive Structure)

Since the conductive structure of the present invention has a high electrical conductivity, flexural strength, and flexural modulus, it is the best to use a structure that requires high electrical conductivity and mechanical characteristics such as a separator for a fuel cell.

Further, the conductive structure of the present invention has extremely high performance in that it can reproduce the electrical conductivity of graphite as faithfully as possible and is molded with dimensional accuracy. Therefore, the structure is useful for various applications such as electronics, electrical parts, machine parts, and automotive parts, and can be cited as a suitable material, especially, for collectors for capacitors and various batteries, electromagnetic wave shielding materials, electrodes, heat-radiating plates, heat-radiating parts, electronics parts, semiconductor parts, bearings, PTC elements, brushes, and separators for a fuel cell.

EXAMPLES

Examples of the present invention will hereinafter be described in further detail, but it is not restricted thereto. A method for measuring physical properties of a molded body will first be described hereinafter. The volume resistivity is measured by a four-pin probe method in conformity with JIS K7194.

The resistivity in a thickness direction is measured by a four-pin probe method as shown in FIG. 1. More specifically, four test pieces (50 mm×50 mm×2 mm) are stacked and sandwiched between two gold-coated brass plates to be pressurized uniformly at 2 MPa, and then a constant current of 1 A is applied between the gold-coated brass plates in the penetration direction to measure the voltage and thereby obtain the resistance ($R_1$). Two test pieces are stacked similarly and sandwiched between gold-coated brass plates, and then the same measurement as above is made to obtain the resistance ($R_2$). Further, the difference between the resistances ($R_1$ and $R_2$) is multiplied by the contact area (S) and divided by the total thickness of the two test pieces (t) to obtain the resistivity in a thickness direction as expressed by Formula 2.

[Formula 2]

$$Rt=(R_1-R_2)\times S/t \quad (2),$$

where "Rt" represents a resistivity in a thickness direction ($\Omega$cm), "S" a contact area (cm$^2$), "$R_1$" a resistance obtained in the measurement 1 ($\Omega$), "$R_2$" a resistance obtained in the measurement 2 ($\Omega$), and "t" the total thickness of the two test pieces (cm).

The flexural strain, flexural modulus, and flexural strain of a test piece (80 mm×10 mm×4 mm) are measured under 3-point loading condition using an autograph (AG-10kNI) manufactured by Shimadzu Corp. in conformity with JIS K6911 at a span interval of 64 mm and a bending rate of 1 mm/min.

The crystal melting heat X of a conductive structure is measured using a DSC (DCS7-type manufactured by Perkin Elmer, Inc.) as follows. An aluminum pan, in which part (10 mg) of the conductive structure is precisely weighed as a sample, is set in the DSC together with an empty aluminum pan carrying no sample. X represents a value obtained by dividing the crystal melting heat observed when heating both aluminum pans from 25° C. to a temperature 60° C. or more higher than $T_m$ at a heating rate of 20° C./min by the mass of the sample, the unit of which is J/g.

The value Y representing the crystal melting heating limit of crystalline thermoplastic resin composite material is measured using the DSC as follows. An aluminum pan, in which part (10 mg) of the crystalline thermoplastic resin composite material is precisely weighed as a sample, is set in the DSC together with an empty aluminum pan carrying no sample. Y represents a value obtained by dividing the crystal melting heat observed when keeping both aluminum pans at a temperature 60° C. or more higher than $T_m$ for 10 minutes, cooling the pans to 25° C. at a cooling rate of 5° C./min to be kept at 25° C. for 10 minutes, and then heating the pans to a temperature 60° C. or more higher than $T_m$ at a heating rate of 20° C./min by the mass of the sample, the unit of which is J/g.

The melting temperature $T_m$ of the crystalline thermoplastic resin composite material is measured using the DSC as follows. An aluminum pan, in which part (10 mg) of the crystalline thermoplastic resin composite material is precisely weighed as a sample, is placed is set in the DSC together with an empty aluminum pan carrying no sample. Both aluminum pans are held at a temperature at which the sample can completely be melted (since accurate melting temperature is not known at this point, a temperature 60° C. or more higher than the crystal melting temperature of the crystalline thermoplastic resin contained in the sample is used as a measure) for 10 minutes, and then cooled to 25° C. at a cooling rate of 20° C./min. Subsequently, after the sample is kept at 25° C. for 10 minutes, the sample is reheated at a heating rate of 20° C./min to the temperature at which the sample can completely be melted. The top temperature of the endothermic peak due to the crystal melting in this process is represented by $T_m$. If there is a plurality of endothermic peaks, the top temperature of the endothermic peak that indicates the highest temperature is represented by $T_m$.

Also, the crystallization temperature $T_c$ of the crystalline thermoplastic resin composite material is measured using the DSC as follows. An aluminum pan, in which part (10 mg) of the crystalline thermoplastic resin composite material is precisely weighed as a sample, is set in the DSC together with an empty aluminum pan carrying no sample. Both aluminum pans are held at a temperature 60° C. or more higher than $T_m$ for 10 minutes, and then cooled to 25° C. at a cooling rate of 20° C./min. The top temperature of the exothermic peak due to the crystallization in this process is represented by $T_c$. If there is a plurality of exothermic peaks, the exothermic peak of a crystalline thermoplastic resin that has the largest volume fraction among components that constitute the composite material is represented by $T_c$.

The materials used will be described hereinafter.

The materials shown in Table 1 were used as polymer components.

Polypropylene: SunAllomer PW201N manufactured by SunAllomer, Ltd., styrene-ethylene/butylene-styrene block copolymer (SEBS): Kraton G1652 manufactured by Kraton Polymers Japan, Ltd., hydrogenated styrene-butadiene rubber (H-SBR): Dynalon 1320P manufactured by JSR Corp., polyvinylidene fluoride (PVDF): Neoflon VW-410 manufactured by Daikin Industries, Ltd., and soft acrylic resin: Parapet SA-FW001 manufactured by Kuraray Co., Ltd.

TABLE 1

| | | | P1 | P2 | P3 | P4 |
|---|---|---|---|---|---|---|
| Polymer components | Polypropylene | SunAllomer PW201N | 100 | 95 | 95 | |
| | SEBS | Kraton 61652 | | 5 | | |
| | M-SBR | Dynalon 1320P | | | 5 | |
| | PVDF | Neoflon VW-410 | | | | 90 |
| | Soft acrylic resin | Parapet SA-FW001 | | | | 10 |

Component B: Conductive Filler Material

<B1>: Boron-Containing Fine Graphite Powder

MC coke manufactured by MC Carbon Co., Ltd., as non-needle coke was crushed coarsely into grains of 2 to 3 mm or less in size using a pulverizer (manufactured by Hosokawa-micron Corp.). These coarse grains were crushed finely using a jet mill (IDS2UR manufactured by Nippon Pneumatic Mfg. Co., Ltd.), and then classified into desired grain diameters. Grains of 5 μm or less in size were removed by airflow classification using a Turbo classifier (TC15N manufactured by Nisshin Engineering Inc.). 0.6 kg of boron carbide ($B_4C$) was added to part (14.4 kg) of the thus classified fine grains, and then mixed using a Henschel mixer (trademark) at 800 rpm for 5 minutes. The mixture was encapsulated in a graphite crucible having an inside diameter of 40 cm and a volume of 40 L with a cover, and then placed in a graphitization furnace utilizing a graphite heater to be graphitized in argon gas atmosphere at a temperature of 2900° C. The powder was taken out of the crucible after being left and cooled to find that the production amount was 14 kg. The obtained fine graphite powder had an average grain diameter of 20.5 μm and a B content of 1.9 mass %.

<B2>: Mixture of vapor-grown carbon fiber (hereinafter abbreviated as "VGCF," a trademark of Showa Denko K.K.) and B1 (fine graphite powder). 95 mass % of B1 component and 5 mass % of VGCF were mixed in a Henschel mixer (trademark). The obtained carbonaceous mixture had an average grain diameter of 12.4 μm and a B content of 1.3 mass %.

VGCF-G (fiber diameter: 0.1 to 0.3 μm, fiber length: 10 to 50 μm) manufactured by Showa Denko K.K. was used as the vapor-grown carbon fiber.

<B3>: Mixture of carbon nanotube (hereinafter abbreviated as "CNT") and B1 (fine graphite powder). 95 mass % of B1 component and 5 mass % of CNT were mixed in a Henschel mixer (trademark). The obtained carbonaceous mixture had an average grain diameter of 9.2 μm and a B content of 1.2 mass %. Carbon nanotubes were obtained as follows.

A hole of 3 mm in diameter and 30 mm in depth was formed from the leading edge of a graphite bar of 6 mm in diameter and 50 mm in length along the central axis thereof, and rhodium (Rh), platinum (Pt) and graphite (C) were stuffed into the hole at a mass ratio of 1:1:1 as mixed powder to produce an anode. Meanwhile, a cathode of 13 mm in diameter and 30 mm in length made of graphite having a purity of 99.98 mass % was produced. These electrodes were arranged in a reaction chamber facing each other to be connected to a direct-current power source. Then, the air inside the reaction chamber was replaced with helium gas having a purity of 99.9 volume % to perform direct-current arc discharge. Subsequently, soot (chamber soot) attached to the inner wall of the reaction chamber and soot (cathode soot) deposited on the cathode were collected. The pressure in the reaction chamber and the current were 600 Torr and 70 A, and the anode and cathode were operated in such a manner as to have a constant gap of 1 to 2 mm therebetween during the reaction.

The collected soot was placed in a mixed solvent containing water and ethanol at a mass ratio of 1:1 to be dispersed ultrasonically, and then the dispersion liquid was collected to eliminate the solvent using a rotary evaporator. Then, after the sample was dispersed ultrasonically in a 0.1% aqueous solution of benzalkonium chloride as a cationic surface-active agent, the sample was centrifugally separated at 5000 rpm for 30 minutes, and then the dispersion liquid was collected. Further, the dispersion liquid was heat-treated and thereby purified in the air at 350° C. for 5 hours to obtain carbon nanotubes having a fiber diameter of 1 to 10 nm and a fiber length of 0.05 to 5 μm.

The type and ratio of the components A and B used in each of the following examples and comparative examples are summarized in Table 2 below. The crystallization temperature, crystal melting temperature, and melting heat Y of each composite material measured using a DSC are also summarized in Table 2. In addition, the values of 0.8×Y are also shown in Table 2.

B (E-3013 manufactured by Nippon Engineering Co., Ltd.), the heat treatment temperature of which was set as shown in Table 3, at a pressure of 15 MPa for 10 minutes. Then, the mold was cooled using a cooling press at a temperature of 25° C. and a pressure of 15 MPa for 2 minutes to obtain a conductive structure.

TABLE 2

|  |  | Composite material 1 | Composite material 2 | Composite material 3 | Composite material 4 | Composite material 5 | Composite material 6 |
|---|---|---|---|---|---|---|---|
| Polymer components | P1 | 15 | 15 | 15 |  |  |  |
|  | P2 |  |  |  | 15 |  |  |
|  | P3 |  |  |  |  | 15 |  |
|  | P4 |  |  |  |  |  | 15 |
| Component B | B1 | 85 |  |  | 85 | 85 | 85 |
|  | B2 |  | 85 |  |  |  |  |
|  | B3 |  |  | 85 |  |  |  |
| Crystallization temperature (° C.) |  | 131.9 | 132.4 | 132.6 | 128.9 | 129.3 | 144.6 |
| Crystal melting temperature (° C.) |  | 165.7 | 166.4 | 166.4 | 166.1 | 166.4 | 176.3 |
| Melting heat Y (J/g) |  | 12.7 | 12.8 | 12.6 | 14.0 | 14.8 | 9.3 |
| 0.8 × Y (Jg) |  | 10.2 | 10.2 | 10.1 | 11.2 | 11.8 | 7.5 |

Examples 1 to 5

The primary materials according to the compositions shown in Tables 1 and 2 were kneaded using a Laboplastmill (model 100C100 manufactured by Toyo Seiki Seisaku-Sho, Ltd.) at a temperature of 200° C. and 45 rpm for 7 minutes to obtain crystalline thermoplastic resin composite material. The composite material was placed in a mold capable of molding a flat plate of 100 mm×100 mm (the thickness varies for each physical property test item), and then pressurized and heated using a 50t compression molding machine A (E-3013 manufactured by Nippon Engineering Co., Ltd.) at a temperature of 230° C. and a pressure of 15 MPa for 3 minutes after 3-minute preheating. Subsequently, the mold was taken out of the compression molding machine A in a hot state, and immediately pressurized using a 50t compression molding machine

Comparative Examples 1 to 5

Crystalline thermoplastic resin composite materials according to the compositions shown in Tables 1 and 2 were obtained through the same procedure as in the first to fifth examples. The kneaded product was placed in a mold capable of molding a flat plate of 100 mm×100 mm (the thickness varies for each physical property test item), and then pressurized and heated using the 50t compression molding machine A at a temperature of 230° C. and a pressure of 15 MPa for 3 minutes after 3-minute preheating. Then, the mold was cooled using a cooling press at a temperature of 25° C. and a pressure of 15 MPa for 2 minutes to obtain a conductive structure. The results obtained in the practical and comparative examples are summarized in Table 3 below.

TABLE 3

|  | Example 1 | Example 2 | Example 3 | Example 4 | Example 5 | Comparative Example 1 | Comparative Example 2 | Comparative Example 3 | Comparative Example 4 | Comparative Example 5 |
|---|---|---|---|---|---|---|---|---|---|---|
| Composite materials used | Composite material 1 | Composite material 2 | Composite material 3 | Composite material 4 | Composite material 5 | Composite material 1 | Composite material 2 | Composite material 3 | Composite material 4 | Composite material 5 |
| Heat treatment temperature (° C.) | 140 | 140 | 140 | 135 | 150 | — | — | — | — | — |
| 0.8 × Y (Jg) | 10.2 | 10.2 | 10.1 | 11.2 | 7.5 | 10.2 | 10.2 | 10.1 | 11.2 | 7.5 |
| Melting heat X (J/g) | 12.9 | 13.0 | 12.9 | 13.4 | 8.3 | 9.8 | 9.7 | 9.9 | 10.8 | 7.3 |
| Volume resistivity (mΩ · cm) | 4.7 | 4.5 | 4.4 | 4.2 | 5.4 | 5.4 | 5.1 | 5.0 | 6.4 | 5.9 |
| Resistivity in thickness direction (mΩ · cm) | 19.2 | 18.0 | 16.5 | 13.0 | 41.4 | 39.7 | 40.5 | 38.6 | 37.3 | 52.2 |
| Flexural strength (MPa) | 57.69 | 58.1 | 57.9 | 53.0 | 54.2 | 49.6 | 50.8 | 51.1 | 45.7 | 51.0 |
| Flexural modulus (GPa) | 9.4 | 9.6 | 9.6 | 13.5 | 8.2 | 8.8 | 9.0 | 9.1 | 12.0 | 6.1 |
| Flexural strain (%) | 1.29 | 1.25 | 1.27 | 1.49 | 1.52 | 1.03 | 1.21 | 1.25 | 1.53 | 1.74 |

Formula 1 is satisfied in all of the examples, but not in any of the comparative examples. Comparing each example in which heat treatment was performed with each comparative example in which heat treatment was not performed, both corresponding embodiments using the same composite material, the examples show a smaller volume resistivity and resistivity in a thickness direction but a higher flexural strength and flexural modulus for every composite material. On the contrary, the flexural strain is smaller than that in the examples, but much higher than a target value (1% or more) required for a separator for a fuel cell.

Examples 6 to 9 and Comparative Example 6

Conductive structures were obtained through the same procedure as in the first to fifth examples except that the composite material 5 was used. The results obtained in the practical and comparative examples are summarized in Table 4 below.

Comparative Example 7

Conductive structures were obtained through the same procedure as in the first to fifth comparative examples except that the composite material 5 was used and that the heat treatment temperature was changed. The results obtained in the comparative example are summarized in Table 4 below.

TABLE 4

|  | Example 6 | Example 7 | Example 8 | Example 9 | Comparative Example 6 | Comparative Example 7 |
|---|---|---|---|---|---|---|
| Composite materials used | Composite material 5 | Composite material 5 | Composite material 5 | Composite material 5 | Composite material 5 | Composite material 1 |
| Heat treatment temperature (° C.) | 130 | 135 | 140 | 145 | 150 | — |
| $0.8 \times Y$ (J/g) | 11.8 | 11.8 | 11.8 | 11.8 | 11.8 | 11.8 |
| Melting heat X (J/g) | 13.4 | 13.4 | 13.3 | 12.3 | 11.7 | 10.8 |
| Volume resistivity (mΩ · cm) | 4.7 | 4.8 | 4.9 | 5.0 | 7.2 | 6.0 |
| Resistivity in thickness direction (mΩ · cm) | 16.1 | 16.6 | 20.5 | 14.2 | 61.5 | 45.7 |
| Flexural strength (MPa) | 46.6 | 51.1 | 52.47 | 49.1 | 50.2 | 48.2 |
| Flexural modulus (GPa) | 7.5 | 7.5 | 9.3 | 8.7 | 7.6 | 7.9 |
| Flexural strain (%) | 1.63 | 1.62 | 1.82 | 1.67 | 2.14 | 2.24 |

Formula 1 is satisfied in all of the examples, but not in any of the comparative examples. Comparing each of the sixth to ninth examples in which heat treatment was performed at a temperature equal to or higher than the crystallization temperature 129.3° C. of the composite material 5 but equal to or lower than 149.3° C., i.e. 20° C. higher than the crystallization temperature with the sixth comparative example in which heat treatment was performed at a temperature of 150° C., i.e. higher than 149.3° C., both corresponding embodiments using the same composite material 5, the examples show a smaller volume resistivity and resistivity in a thickness direction. Comparing each of the sixth to ninth examples with the seventh comparative example in which heat treatment was not performed, the examples also show a smaller volume resistivity and resistivity in a thickness direction.

Example 10

The composite material 5 was placed in a mold capable of molding a flat plate of 100 mm×100 mm (the thickness varies for each physical property test item), and then pressurized and heated using the 50t compression molding machine A at a temperature of 230° C. and a pressure of 15 MPa for 3 minutes after 3-minute preheating. Then, the mold was cooled using a cooling press at a temperature of 25° C. and a pressure of 15 MPa for 2 minutes to obtain a conductive structure. The conductive structure was further inserted in a mold, and then heated and pressurized using the 50t compression molding machine B, the heat treatment temperature of which was set to 155° C., at a pressure of 15 MPa for 120 minutes. Then, the mold was cooled using a cooling press at a temperature of 25° C. and a pressure of 15 MPa for 2 minutes to obtain the conductive structure. The results obtained in the tenth example are summarized in Table 5 below.

Example 11

It is possible to circulate oil in the heating plate of the 50t compression molding machine B. Circulating oil, the temperature of which is precisely controlled by an oil temperature control device, in the heating plate allows the temperature of the heating plate to be controlled precisely. The composite material 5 was placed in a mold capable of molding a flat plate of 100 mm×100 mm (the thickness varies for each physical property test item), and then pressurized and heated using the 50t compression molding machine B at a temperature of 230° C. and a pressure of 15 MPa for 3 minutes after 3-minute preheating. Then, the mold was cooled, while pressurized at a pressure of 15 MPa, at a cooling rate of 5° C./min until the temperature of the heating plate was reduced to 100° C. Subsequently, the mold was cooled using a cooling press at a temperature of 25° C. and a pressure of 15 MPa for 2 minutes to obtain a conductive structure. The results obtained in the eleventh example are summarized in Table 5 below.

TABLE 5

|  | Example 10 | Example 11 | Comparative Example 7 |
|---|---|---|---|
| Composite materials used | Composite material 5 | Composite material 5 | Composite material 5 |
| Conditions for promoting crystallization | Annealing | Gradual cooling at 5° C./min | — |
| $0.8 \times Y$ (J/g) | 11.8 | 11.8 | 11.8 |
| Melting heat X (J/g) | 14.4 | 14.5 | 10.8 |
| Volume resistivity (mΩ · cm) | 5.5 | 3.7 | 6.0 |
| Resistivity in thickness direction (mΩ · cm) | 16.0 | 12.2 | 45.7 |

TABLE 5-continued

| | Example 10 | Example 11 | Comparative Example 7 |
|---|---|---|---|
| Flexural strength (MPa) | 55.7 | 55.5 | 48.2 |
| Flexural modulus (GPa) | 9.7 | 8.2 | 7.9 |
| Flexural strain (%) | 1.77 | 2.00 | 2.24 |

Formula 1 is satisfied in both of the tenth and eleventh examples, but not in the seventh comparative example. Comparing each of the tenth example in which the structure was annealed at 155° C. for 2 hours after the molding process and the eleventh example in which the structure was gradually cooled at a cooling rate of 5° C./min after the shaping process with the seventh comparative example in which heat treatment was not performed, the examples show a smaller volume resistivity and resistivity in a thickness direction.

Example 12 and Comparative Example 8

A mold capable of molding a flat plate of 280 mm×200 mm×1.5 mm in size with six through holes and a groove of 1 mm in width pitch and 0.5 mm in depth formed on either side thereof was mounted on a 350t injection-compression molding machine, and then the composite material 1 was used to obtain a conductive structure by injection-compression molding. The temperature of the cylinder was set to 280° C., and that of the mold to 140° C. Immediately before the molding process, the cavity surface was heated to the cavity surface temperature shown in Table 6 externally using a heater, and then the injection-compression molding was performed at an injection pressure of 100 MPa, a compressing force of 50t, and a cool time of 150 seconds to obtain a flat plate like a separator for a fuel cell. The measurement results of the volume resistivity and the thickness at the center of the flat plate are shown in Table 6.

TABLE 6

| | Example 12 | Comparative Example 8 |
|---|---|---|
| Composite materials used | Composite material 1 | Composite material 1 |
| Cavity surface temperature immediately before the molding process (° C.) | 170 | 160 |
| Volume resistivity (mΩ · cm) | 5.0 | 7.0 |
| Thickness of the flat plate (mm) | 1.50 | 1.75 |

As shown in Table 6, in the twelfth example in which the mold was heated to a temperature equal to or higher than the crystal melting temperature of the composite material 1, a flat plate having the same shape as the cavity of the mold could be obtained, while in the eighth comparative example in which the mold was heated to a temperature lower than the crystal melting temperature, only a flat plate having a thickness greater than that of the cavity of the mold could be obtained.

As shown in Tables 3 to 6, even if the crystalline thermoplastic resin composite material is used as a primary material, a conductive structure molded in accordance with the manufacturing method for the present invention achieves a higher dimensional accuracy and a lower volume resistivity and resistivity in a thickness direction than that of a conductive structure that is not molded in accordance with the manufacturing method of the present invention. Accordingly, the manufacturing method for the present invention is suitably applicable to a method for manufacturing a conductive structure that requires a high dimensional accuracy and electrical conductivity, and is best suited as a method for manufacturing a separator for a fuel cell that requires especially high dimensional accuracy and electrical conductivity.

Although the preferred embodiments of the present invention have been described heretofore, the present invention is not restricted to these embodiments, but there may be other specific additions, omissions, alternations and modifications of the arrangement without departing from the gist of the present invention. It will be appreciated that the present invention is not restricted by the foregoing descriptions, but is restricted only by the scope of the accompanying claims.

What is claimed is:

1. A method for manufacturing an electroconductive structure, wherein when molding a conductive structure made of crystalline thermoplastic resin composite material containing at least crystalline thermoplastic resin and conductive filler material, a cavity surface temperature of a mold is kept equal to or higher than a crystal melting temperature $(T_m+5)°$ C. of said composite material until a shaping of said composite material melted in said mold is completed, and after completion of said shaping process, under the provision that the crystallization temperature of said composite material is represented by $T_c$, the cavity surface temperature of said mold is controlled to be $(T_c\pm20)°$ C. to harden said composite material, wherein referring to said crystalline thermoplastic resin, elastomer and other high molecular weight polymers collectively as a polymer component, said polymer component is 2 to 40 mass%, while said conductive filler material is 60 to 98 mass% of the total mass (100 mass%) of said polymer component and said conductive filler material.

2. A method for manufacturing an electroconductive structure, wherein when molding a conductive structure made of crystalline thermoplastic resin composite material containing at least crystalline thermoplastic resin and conductive filler material, a cavity surface temperature of a mold is kept equal to or higher than a crystal melting temperature $(T_m+5)°$ C. of said composite material until a shaping of said composite material melted in said mold is completed, and after shaping of said composite material melted in a mold is completed, under the provision that a crystallization temperature of said composite material is represented by $T_c$, said composite material is cooled at a cooling rate of 30° C./min or less within a temperature range of $(T_c\pm20)°$ C., wherein referring to said crystalline thermoplastic resin, elastomer and other high molecular weight polymers collectively as a polymer component, said polymer component is 2 to 40 mass%, while said conductive filler material is 60 to 98 mass% of the total mass (100 mass%) of said polymer component and said conductive filler material.

3. A method for manufacturing an electroconductive structure, wherein a molded electroconductive structure, which is made of crystalline thermoplastic resin composite material containing at least crystalline thermoplastic resin and conductive filler material, is heat-treated at a temperature equal to or lower than a crystal melting temperature $(T_m)$ of said composite material but equal to or higher than $(T_m-20)°$ C., wherein the heat treatment is performed after the electroconductive structure is taken out from the mold after shaping and cooling processes have been completed.

4. The method for manufacturing an electroconductive structure according to any of claims 1 to 3, wherein said electroconductive structure is hardened, cooled, and/or heat-treated while pressurized in said mold or while being pressurized in a sandwiched manner between corrective plates for preventing deformation of said electroconductive structure.

5. The method for manufacturing an electroconductive structure according to any of claims 1 to 3, wherein the molding of said electroconductive structure employs one molding method selected from among injection-compression molding, compression molding, and stamping molding.

6. The method for manufacturing an electroconductive structure according to any of claims 1 to 3, wherein said crystalline thermoplastic resin composite material further contains an elastomer.

7. The method for manufacturing an electroconductive structure according to claim 3, wherein referring to said crystalline thermoplastic resin, elastomer, and other high molecular weight polymers collectively as a polymer component, said polymer component accounts for 2 to 40 mass%, while said conductive filler material accounts for 60 to 98 mass% of the total mass (100 mass%) of said polymer component and said conductive filler material.

8. The method for manufacturing an electroconductive structure according to any of claims 1 to 3, wherein at least one component contained in said crystalline thermoplastic resin is polyolefin.

9. The method for manufacturing an electroconductive structure according to claim 1, wherein said polymer component contains at least one of hydrogenated styrene-butadiene rubber, styrene-ethylene/butylene-styrene block copolymer, styrene-ethylene/propylene-styrene block copolymer, olefin crystal-ethylene/butylene-olefin crystal block copolymer, styrene-ethylene/butylene-olefin crystal block copolymer, styrene-isoprene-styrene block copolymer, and styrene-butadiene-styrene block copolymer and polyolefin.

10. The method for manufacturing an electroconductive structure according to claim 1, wherein said polymer component contains at least polyvinylidene fluoride and soft acrylic resin.

11. The method for manufacturing an electroconductive structure according to any of claims 1 to 3, wherein said conductive filler material contains at least one selected from the group of metallic material, carbonaceous material, conductive polymer, metal-coated filler, and metal oxide.

12. The method for manufacturing an electroconductive a conductive structure according to any of claims 1 to 3, wherein said conductive filler material contains carbonaceous material containing 0.05 to 5 mass% of boron.

13. The method for manufacturing an electroconductive structure according to any of claims 1 to 3, wherein said conductive filler material contains 0.1 to 50 mass% of vapor-grown carbon fiber and/or carbon nanotube (based on the total mass of said conductive filler material containing the same).

14. The method for manufacturing an electroconductive structure according to claim 13, wherein said vapor-grown carbon fiber or said carbon nanotube contains 0.05 to 5 mass% of boron.

15. The method for manufacturing an electroconductive structure according to claim 1, wherein referring to said crystalline thermoplastic resin, elastomer, and other high molecular weight polymers collectively as a polymer component, said polymer component is 5 to 30 mass%, while said conductive filler material is 70 to 98 mass% of the total mass (100 mass%) of said polymer component and said conductive filler material.

16. The method for manufacturing an electroconductive structure according to claim 2, wherein referring to said crystalline thermoplastic resin, elastomer, and other high molecular weight polymers collectively as a polymer component, said polymer component is 5 to 30 mass%, while said conductive filler material is 70 to 98 mass% of the total mass (100 mass%) of said polymer component and said conductive filler material.

17. A method for manufacturing an electroconductive structure according to claim 1 or 2, wherein the electroconductive structure, made of crystalline thermoplastic resin composite material containing at least crystalline thermoplastic resin and conductive filler materials, is heat treated in the mold at a temperature equal to or lower than a crystal melting temperature ($T_m$) of said composite material but equal to or higher than ($T_m-20$)° C. after the shaping process and the cooling process has been completed.

* * * * *